US008636922B2

(12) United States Patent
Grover et al.

(10) Patent No.: US 8,636,922 B2
(45) Date of Patent: Jan. 28, 2014

(54) PROCESS FOR RECOVERING HYDROGEN AND CARBON DIOXIDE FROM A SYNGAS STREAM

(75) Inventors: Bhadra S. Grover, Sugar Land, TX (US); Paul Terrien, Philadelphia, PA (US)

(73) Assignee: L'Air Liquide Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 322 days.

(21) Appl. No.: 12/827,291

(22) Filed: Jun. 30, 2010

(65) Prior Publication Data

US 2012/0003145 A1 Jan. 5, 2012

(51) Int. Cl.
*C01B 3/38* (2006.01)
*C01B 3/26* (2006.01)

(52) U.S. Cl.
USPC .......................................... 252/373; 423/651

(58) Field of Classification Search
USPC ......................................................... 252/373
See application file for complete search history.

(56) References Cited

U.S. PATENT DOCUMENTS

| 4,025,318 A | 5/1977 | Moody et al. |
| 5,132,007 A | 7/1992 | Meyer et al. |
| 5,861,051 A | 1/1999 | Critchfield et al. |
| 6,090,312 A | 7/2000 | Ziaka et al. |
| 6,572,680 B2 | 6/2003 | Baker et al. |
| 7,175,694 B2 | 2/2007 | Ma et al. |
| 7,703,519 B2 | 4/2010 | De Francesco |
| 2008/0000350 A1 | 1/2008 | Mundschau et al. |
| 2009/0064582 A1* | 3/2009 | Malhotra et al. ................... 48/85 |
| 2009/0117024 A1 | 5/2009 | Weedon et al. |
| 2009/0180949 A1 | 7/2009 | Cui et al. |
| 2010/0047160 A1* | 2/2010 | Allam .......................... 423/651 |
| 2010/0104499 A1 | 4/2010 | Grover |
| 2010/0104903 A1 | 4/2010 | Gummalla et al. |
| 2010/0126180 A1 | 5/2010 | Forsyth et al. |

OTHER PUBLICATIONS

Kohl et al., "Physical Solvent for Acid Gas Removal", pp. 1187 to 1237, Gas Purification, 5th Edition, Gulf Publishing Company, Houston, TX, Copyright 1960.
Sjardin, Milo et al., "Techno-Economic Prospects of Small-Scale Membrane Reactors in a Future Hydrogen-Fuelled Transportation Sector", Copernicus Institute, Dept., STS, Utrecht University, 3584 CS Utrecht, The Netherlands. Received Aug. 30, 2005. Elsevier Ltd. 2006. www.sciencedirect.com.
PCT/US2011/042070, International Search Report and Written Opinion issued Oct. 7, 2011.
A. Criscuoli, A. Basile, E. Drioli and O. Loiacono, "An economic feasibility study for water gas shift membrane reactor", Journal of Membrane Science, Elsevier Scientific Publication Company, Amsterdam, NL., vol. 181, No. 1, Jan. 15, 2001, pp. 21-27.

(Continued)

*Primary Examiner* — Melvin C Mayes
*Assistant Examiner* — Kenneth Vaden
(74) *Attorney, Agent, or Firm* — Elwood L. Haynes

(57) ABSTRACT

The present invention provides a process for recovering high purity gaseous hydrogen and high purity gaseous carbon dioxide from a syngas stream by utilizing a hydrogen selective membrane unit and a primary water gas shift reactor in combination with a cryogenic purification unit, a hydrogen recovery unit and a secondary water gas shift reactor or by utilizing a hydrogen membrane/water gas shift reactor in combination with a cryogenic purification unit, a hydrogen recovery unit and a secondary water gas shift reactor. Each of these embodiments may further include a sulfur recovery unit.

35 Claims, 6 Drawing Sheets

(56) References Cited

OTHER PUBLICATIONS

Bracht, P.T. Alderliesten, R. Kloster, R. Pruschek, G. Haupt, E. Xue, J.R.H. Ross, M.K. Koukou and Papayannakos, "Water gas shift membrane reactor for CO2 control in IGCC systems: techno-economic feasibility study", Energy Conversion and Management, Elsevier Science Publishers, Oxford, GB, vol. 38, No. 1001 Jan. 1, 1997, pp. S159-S164.

Criscuoli, A., et al., "An Economic Feasibility Study for Water Gas Shift Membrane Reactor", Journal of Membrane Science, Oct. 12, 1999, Elsevier Science B.V. 2001, 0373-7338/01/$.

Bracht, M., et al., "Water Gas Shift Membrane Reactor for CO2 Control in IGCC Systems: Techno-Economic Feasibility Study", Energy Conyers. Mgmt, vol. 38, Suppl., pp. S159-S164, 1997. Great Britain.

* cited by examiner

US 8,636,922 B2

PROCESS FOR RECOVERING HYDROGEN AND CARBON DIOXIDE FROM A SYNGAS STREAM

FIELD OF THE INVENTION

The present invention relates to a process for recovering high purity gaseous hydrogen and high purity gaseous carbon dioxide from a syngas stream utilizing a primary water gas shift reactor in combination with a membrane separation unit, a cryogenic purification unit, a secondary water gas shift reactor and a hydrogen recovery unit or a combined water gas shift/membrane separation reactor in combination with a cryogenic purification unit, a secondary water gas shift reactor and a hydrogen recovery unit.

BACKGROUND

Carbon dioxide (hereinafter "$CO_2$") capture and sequestration from coal fed power plants presents a large challenge. While there are existing technologies, they are capital and energy intensive. In an integrated Gasification Combined Cycle (hereinafter "IGCC") plant, coal is gasified and a syngas which contains $CO_2$, as well as a variety of other components, is produced. Typically, the $CO_2$ from the syngas is removed by solvents before being sent to the gas turbine where it is burned to produce electricity. The cost of $CO_2$ removal increases the cost of the electricity produced. An industry wide goal has been set that the cost increase should not exceed 30%. To meet this goal new innovations for $CO_2$ capture are required.

Today coal or solid bio-mass is gasified in a variety of gasifiers. For pre-combustion $CO_2$ removal, $CO_2$ is removed from the $CO_2$/hydrogen mixture obtained after shifting carbon monoxide (hereinafter "CO") rich syngas. $CO_2$ typically forms from about 40% to about 60% of the syngas after CO is shifted to $CO_2$. The $CO_2$ separation is usually performed by utilizing solvents such as RECTISOL®, SELEXOL® or amines. These processes produce $CO_2$ at a low pressure, close to atmospheric pressure. A large amount of power is required to compress $CO_2$ to 150 bar, the pressure required for sequestration. Accordingly, these processes are capital as well as energy intensive.

A variety of hydrogen selective membranes such as palladium membranes to concentrate the $CO_2$ from the syngas stream have been developed. For example, U.S. Pat. No. 7,175,694 describes such a membrane. These membranes intensify the CO shift and produce a $CO_2$ rich stream at high pressure. The $CO_2$ free hydrogen produced by membranes is at low pressure and is then compressed for use in the gas turbine. There is a significant loss of hydrogen (hereinafter "$H_2$") and CO products left in the $CO_2$ stream, thereby affecting the efficiency of the process. Accordingly, there is a need to overcome this efficiency issue.

In a 1997 Elsevier article ("Water Gas Shift Reactor For $CO_2$ Control In IGCC Systems: Techno-Economic Feasibility Study"), Bracht et al. describe a system with a membrane shift reactor on a gasifier syngas. The solution proposed for residual gas treatment was a catalytic burner which requires the use of oxygen (hereinafter "$O_2$") and the residual CO and $H_2$ are valued at best as fuel.

As noted above, while there currently exists a number of processes to capture and sequester $CO_2$ from coal fed power plants, these processes are not without limitations and/or problems. The present invention provides an alternative way to treat this residual gas which overcomes many of the limitations/issues associated with these prior art processes.

SUMMARY OF THE INVENTION

The present invention provides for the use of a hydrogen selective membrane unit, a cryogenic purification unit, a hydrogen recover unit and multiple water gas shift reactors to recover pure $H_2$ from a coal or bio-mass fed gasification units, thereby resulting in a $H_2$ rich stream and a $CO_2$ rich stream at high pressure. In one embodiment, the hydrogen selective membranes utilized are integrated into the water gas shift reactor, thus simultaneously shifting CO to $CO_2$ and separating $H_2$. The $CO_2$ stream produced is at high pressure and contains some CO, methane (hereinafter "$CH_4$") and $H_2$ products. This invention proposes to separate the $CO_2$ from this stream at reduced energy cost by utilizing a cryogenic purification unit. The non-condensable gases from this cryogenic purification unit are a mixture of CO, $CH_4$, $H_2$ and $CO_2$ at high pressure. It is proposed to recover a high pressure CO and $H_2$ from this stream. The invention proposes to heat this non-condensable stream, add steam and shift CO into $H_2$ in a second water gas shift reactor. The outlet gas of this second shift unit is sent to a high pressure hydrogen recovery unit (typically a hydrogen pressure swing adsorption process).

DETAILED DESCRIPTION OF THE INVENTION

By combining a primary water gas shift (hereinafter "WGS") reactor, a membrane separation unit (hereinafter "MSU"), a cryogenic purification unit (hereinafter "CPU"), a secondary water gas shift (hereinafter "WGS") reactor and a hydrogen recovery unit or by integrating the MSU into the WGS reactor (hereinafter collectively referred to as "WGS/

MSU reactor") and combining this integrated device with a CPU, a secondary WGS reactor and a hydrogen recovery unit, it is possible to sequester $H_2$ and $CO_2$ from the syngas streams produced in fuel gasification units that overcome many of the disadvantages of the prior art systems that deal with sequestering of $H_2$ and $CO_2$ from syngas streams produced in fuel gasification units, especially solid fuel gasification units. The proposed processes of the present invention involve two different main embodiments. The first of these main embodiments includes the use of a primary WGS reactor, a MSU, a CPU, a secondary WGS reactor and a hydrogen recovery unit. The second of these main embodiments involves the use of a WGS/MSU reactor, a CPU, a secondary WGS reactor and a hydrogen recovery unit.

With regard to the first main embodiment, a number of variations are also available including: 1) a primary WGS reactor, a MSU, a CPU, a secondary WGS reactor and a hydrogen recovery unit; 2) a sulfur recovery unit, a primary WGS reactor, a MSU, a CPU, a secondary WGS reactor and a hydrogen recovery unit; and 3) a primary WGS reactor, a sulfur recovery unit, a MSU, a CPU, a secondary WGS reactor and a hydrogen recovery unit. With regard to the second embodiment, a number of additional variations are also available including: 1) a WGS/MSU reactor, a CPU, a secondary WGS reactor and a hydrogen recovery unit, 2) a sulfur recovery unit, a WGS/MSU reactor, a CPU, a secondary WGS reactor and a hydrogen recovery unit; and 3) a WGS/MSU reactor, a sulfur recovery unit, a CPU, a secondary WGS reactor and a hydrogen recovery unit.

Figure 1:
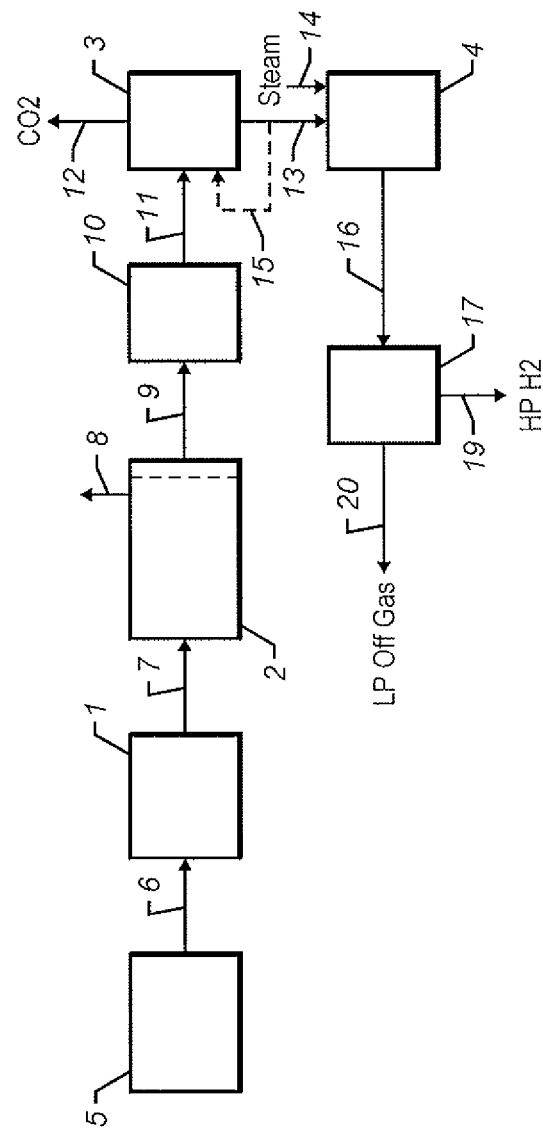
FIG. 1 provides a schematic of the process of the present invention which is carried out utilizing a primary water gas shift reactor, a membrane separation unit, a cryogenic purification unit, a secondary water gas shift reactor and a hydrogen recovery unit.

As noted above, the first main embodiment of the present invention, as depicted in FIG. 1, involves the use of a primary WGS reactor 1, a MSU 2, a CPU 3, a secondary WGS reactor 4 and a hydrogen recovery unit 17 in a process to recover H2 and CO2 from syngas streams produced from one or more hydrocarbon fuel sources in a gasification unit 5. The first step of the process of the present invention involves generating a high pressure syngas stream comprising at least $H_2$ and $CO_2$ from one or more hydrocarbon fuel sources in the gasification unit 5. As used herein, the phrase "gasification unit" refers to any gasification unit 5 known in the art which is capable of processing hydrocarbon fuel sources in order to produce a syngas stream that contains at least $H_2$ and $CO_2$. The present invention is not meant to be limited by such gasification units 5. As used herein, the phrases "hydrocarbon fuel", "hydrocarbon fuels". "hydrocarbon fuel source" or "hydrocarbon fuel sources" refer to any solid or liquid fuel or solid or liquid fuel source which is derived from organic materials such as refinery residue materials (for example, tar, heavy oils, petcoke, coke) or coke or biofuels (for example, wood, peat, corn, corn husks, wheat, rye and other grains). In the preferred embodiments of the present invention, the hydrocarbon fuel sources are preferably selected from refinery residues, coal and biofuels. Gasification units 5 such as those proposed for the present process are readily known to those skilled in the art.

With regard to the gasification units 5, the desired syngas stream is one that contains $H_2$ and $CO_2$ as these are the ultimate products. However, depending upon the original hydrocarbon fuel source utilized, the final syngas stream produced in the gasification units 5 may include a variety of other components such as, but not limited to, CO, sulfur containing compounds and nitrogen containing compounds in the syngas that is produced in the gasification unit 5.

As noted above, the syngas stream that is to be used is a high pressure syngas stream. In many of the gasification units 5 contemplated for use in the present invention, the resulting syngas stream produced will already be at a high pressure. As used herein, the term "high pressure" when referring to the syngas stream to be injected into the primary WGS reactor 1 refers to a syngas stream that is at a pressure from about 15 bar to about 100 bar, preferably from about 30 bar to about 80 bar. In the event that the syngas stream produced in the gasification unit 5 has a pressure that is less than about 15 bar, it is possible to include a compressor (not shown) at this point in the process in order to compress the syngas stream to the desired pressure before injecting the high pressure syngas stream into the primary WGS reactor 1.

In addition, the high pressure syngas stream is typically utilized at a temperature from about 200° C. to about 500° C., preferably from about 250° C. to about 450° C., and even more preferably from about 300° C. to about 400° C. In the event that the temperature of the high pressure syngas stream is outside of this temperature range, a heat exchanger (not shown) may be utilized to achieve the desired temperature range.

The second step of the present process involves treating the high pressure syngas stream from the gasification unit 5 in a primary WGS reactor 1 in order to obtain a primary WGS effluent in which CO and $H_2O$ react to form $H_2$ and $CO_2$. The high pressure syngas stream is introduced into the primary WGS reactor 1 via line 6. In one alternative, steam can be added to the high pressure syngas stream for the water gas shift reaction. The amount of steam added for the water gas shift reaction will depend upon the composition of the high pressure syngas stream being treated. The determination of such amounts is well within the knowledge of those skilled in the art. Note that the steam may be added prior to the high pressure syngas stream being introduced into the primary WGS reactor 1 via line 6 or it may be added after the high pressure syngas stream is introduced into the primary WGS reactor 1. In another alternative, the addition of steam is not necessary.

As a result of the water gas shift reaction, a primary WGS effluent is produced. The primary WGS effluent is withdrawn and then introduced into a MSU 2 via line 7. The MSU 2 is highly selective for $H_2$. The MSU 2 which is utilized comprises one or more modules (not shown) that contain one or more membranes (not shown) that are selective for $H_2$ with the number of modules used being determined by the size of the facility and the throughput of high pressure syngas to be treated. Each of the membranes utilized has a permeate side and a residue side and allows for the passing of $H_2$ to the permeate side to form a first membrane stream on the permeate side of the membrane and the retention of $CO_2$ and the remaining components in the primary WGS effluent to form a second membrane stream on the residue side of the membrane. Note that any MSU 2 configuration may be utilized in the present invention provided that it includes membranes that are highly selective for $H_2$. As used herein, the phrase "highly selective for $H_2$" refers to those membranes which allow for the passage of $H_2$ while limiting the passage of other components. More specifically, with regard to the membranes, the phrase "highly selective for $H_2$" results in the production of a permeate stream that is $H_2$ rich. With regard to the permeate stream, the phrase "$H_2$ rich" refers to a stream that has 70% or greater $H_2$, preferably 80% or greater $H_2$ and even more preferably 90% or greater $H_2$.

As noted, the type of membrane to be utilized must be highly selective for $H_2$. A number of such membranes are known in the art and include, but are not limited to, dense phase metallic membranes, such as palladium membranes and polymeric membrane with dense phase palladium membranes being the most preferred membranes with regard to the present embodiment. Note that mixtures of such membranes may also be utilized. The actual configuration of the MSU 2 is such that it receives the primary WGS effluent and passes this primary WGS effluent stream through one or more modules which include one or more membranes. With regard to the MSU 2, through the use of pressure differentials and the specific membranes, it is possible to separate the components in the primary WGS effluent stream. Also with regard to this particular embodiment, the operating temperature for the membranes is determined by the type of membrane being utilized. The temperature of the WGS effluent is adjusted to a value desired for the particular membrane. These values are known to those skilled in the art.

As noted above, by passing the primary WGS effluent through the MSU 2, a first membrane stream and a second membrane stream are obtained. This first membrane stream is in the form of a $H_2$ rich stream as defined herein before. This $H_2$ rich stream is withdrawn from the permeate side of the membrane via line 8. This $H_2$ rich stream may be stored for further use at a later date or it may be utilized in any number of different processes.

The second membrane stream that is obtained from the residue side of the membrane is withdrawn via line 9. The residue stream may be processed through a compressor (not shown) and a dehydration unit 10. In one embodiment, the second membrane stream is compressed prior to being processed in the dehydration unit 10. In an alternative embodiment, the second membrane stream is processed in the dehydration unit 10 prior to being compressed. In the more preferred embodiment, the second membrane stream is processed in the dehydration unit 10 prior to being compressed since this allows for the use of a compressor that is made of carbon steel (a lower-cost compressor) rather than a compressor that is made of stainless steel which would be required in those instances where the stream that is being compressed contains water, with wet CO2 being corrosive to carbon steel. The withdrawn stream is processed through the compressor to achieve a pressure that is suitable for $CO_2$ removal in a CPU 3. More specifically, the second membrane stream is compressed to a pressure that is optimal for $CO_2$ removal in a CPU 3, a pressure that will typically range from about 30 bar to about 100 bar, preferably from about 30 bar to about 80 bar. The compression may be carried out using any compressor that is known in the art. Typically this compression is carried out by utilizing an independent compressor. However, with regard to the present invention, it may be that the MSU 2 contains a compressor within the specific unit.

The withdrawn stream is processed in the dehydration unit 10 to reduce the dew point in the second membrane stream to a temperature that is lower than the temperature utilized in the CPU 3 purification of the stream (the temperature reached in the next cryogenic purification step) in order to produce a compressed and dried second membrane stream. The dewpoint of the second membrane stream is reduced to a temperature that is suitable for cryogenic purification without causing the plugging of the purification unit due to the water in the stream freezing. With regard to the particular dehydration unit 10, any dehydration unit 10 that is known in the art may be utilized to carry out the drying of this compressed second membrane stream. More notably, a dehydration unit 10 that includes one or more fixed beds (not shown) of an absorbent will be utilized in order to remove water from the second membrane stream. A variety of different adsorbents may be used in the dehydration unit with the only limitation being that the adsorbent caused the reduction of the dew point in the second membrane stream to a temperature that is lower than the temperature utilized in the CPU 3 purification of the stream. As a result of being subjected to the dehydration unit 10, the second membrane strain is now a dried second membrane stream.

Once the second membrane stream has been dried and compressed, this dried and compressed second membrane stream is then passed via line 11 to the CPU 3 where it is processed in the CPU 3. The CO2 is separated and potentially purified through multiple or single step partial condensation and/or distillation at sub-ambient temperature using external refrigeration means (not shown) or an auto-refrigerated process (not shown) to produce a $CO_2$ rich stream and a high pressure non-condensable mixture of at least CO, $H_2$ and $CO_2$. The $CO_2$ rich stream is withdrawn via line 12 and either further used for liquid $CO_2$ production, injection for enhanced oil recovery, or stored for sequestration. Note that the invention is not meant to be limited by the type of CPU 3 utilized and any CPU 3 known in the art may be utilized in the process of the present invention.

In the next step of the process, the high pressure non-condensable mixture that is obtained from the CPU 3 processing of the second membrane stream is then routed via line 13 to a secondary WGS reactor 4 where it is further processed to even further increase the $H_2$ concentration in the high pressure non-condensable mixture. As with the primary WGS reactor 1, any WGS reactor that is known in the art may be utilized as the secondary WGS reactor 4. The WGS reaction in each of the WGS reactors 1, 4 is carried out under standard operating conditions that are known to those skilled in the art. In a further option, the high pressure non-condensable mixture may be heated and steam added to the mixture via line 14 in order to produce the secondary WGS effluent.

In a still further alternative, a portion of the high pressure non-condensable mixture is recycled to the CPU 3 via line 15 and the remaining portion of the high pressure non-condensable mixture is routed to the secondary WGS reactor 4 via line 13. With regard to the secondary WGS effluent, which is withdrawn via line 16, a variety of measures can be taken. More specifically, a portion of this secondary WGS effluent may be recycled to MSU 2, with the remaining being used for hydrogen recovery.

The secondary WGS effluent is then passed via line 16 to and processed in a hydrogen recovery unit 17. Such hydrogen recovery units 17 are known in the art and include, but are not limited to, hydrogen recovery units 17 selected from a hydrogen pressure swing absorption unit, and additional hydrogen separation membrane unit, or a combination of a hydrogen pressure swing absorption unit and an additional hydrogen membrane separation unit. The preferred hydrogen recovery unit 17 is a hydrogen pressure swing adsorption unit. The parameters for operating hydrogen pressure swing adsorption units and additional hydrogen membrane separation units are known in the art. As a result of being treated in a hydrogen recovery unit 17, is possible to withdraw a $H_2$ stream via line 19 and an off gas via line 20. The off gas may be further treated to extract additional components or used as fuel.

Figure 2:
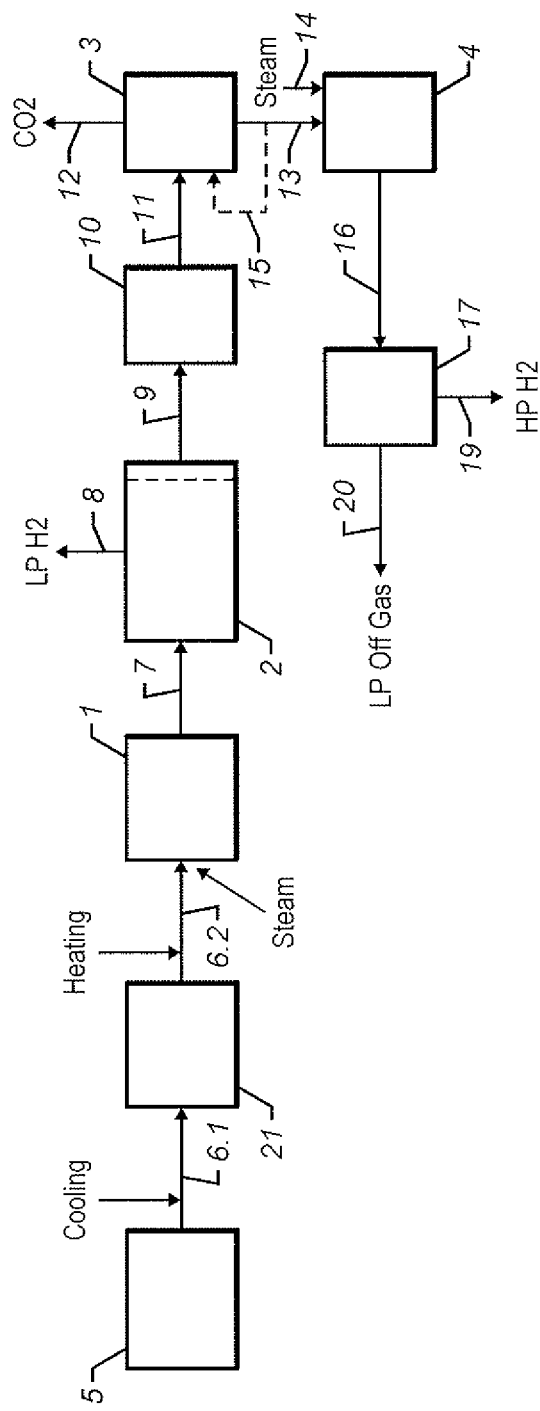
FIG. 2 provides a schematic of the process of the present invention which is carried out utilizing a sulfur recovery unit, a primary water gas shift reactor, a membrane separation unit, a cryogenic purification unit, a secondary water gas shift reactor and a hydrogen recovery unit.
Figure 3:
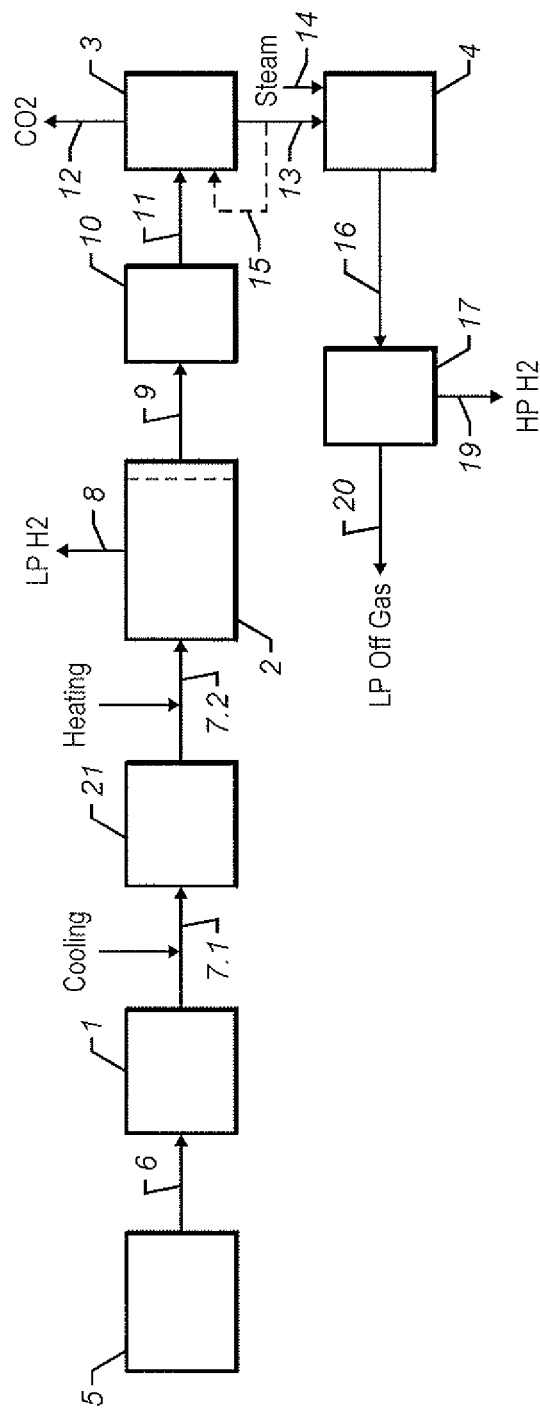
FIG. 3 provides a schematic of the process of the present invention which is carried out utilizing a primary water gas shift reactor, a sulfur recovery unit, a membrane separation unit, a cryogenic purification unit, a secondary water gas shift reactor and a hydrogen recovery unit.

In a still further alternative to the first embodiment of the present invention as depicted in FIGS. 2 and 3, depending upon the high pressure syngas stream produced in the gasification unit 5, it may be advantageous to remove sulfur compounds that are present prior to the stream being introduced into the WGS 1 and/or MSU 2. The art of desulfurization of gasifier syngas is well known, as described in Gas Purification by Arthur Kohl and Richard Nielsen, Fifth Edition, pages 1187-1237. This may be accomplished in two manners. The first manner depicted in FIG. 2 involves the removal of the sulfur compounds present prior to treatment of the stream in the primary WGS reactor 1. More specifically, this alternative comprises removing the sulfur compounds present in the high pressure syngas stream utilizing a sulfur recovery unit 21 to form a sweet high pressure syngas stream prior to the high pressure syngas stream being introduced into the primary WGS reactor 1 and then the MSU 2. With regard to this embodiment, depending upon the type of sulfur removal process utilized, as the syngas stream will typically be a the temperature that is higher than recommended for most desulfurization processes, in many instances it will be necessary to cool the syngas stream (utilizing a heat exchanger) prior to this stream being introduced into the sulfur recovery unit. Accordingly, in this particular embodiment, the high pressure syngas stream is withdrawn via line 6.1, subjected to cooling (using a heat exchanger (not shown)) to achieve a temperature of that is in line with desulfurization.

Once the sulfur has been removed from the stream, the resulting stream is then introduced via line 6.2 into the primary WGS reactor 1. As it is necessary for the stream being introduced into the primary WGS reactor to be at a high temperature (note the range of about 200° C. to about 500° C.), in many instances it will be necessary to heat this stream and in some instances to also include steam to push the reaction in the WGS reactor. This heating can be carried out utilizing a heat exchanger (not shown). Once the stream has been treated in the primary WGS reactor 1, the resulting stream would be treated in the MSU 2, the CPU 3, then the secondary WGS reactor 4 and then the hydrogen recovery unit 17 as described hereinbefore.

The second manner as depicted in FIG. 3 is the same as discussed hereinbefore with the exception that this embodiment involves the removal of the sulfur compounds present in the primary WGS effluent in the sulfur recovery unit 21 to form a sweet primary WGS effluent stream prior to the effluent stream being introduced into the MSU 2. In other words, the sulfur recovery unit 21 is positioned between the primary WGS reactor 1 and the MSU 2. In this embodiment, as with the previous embodiment, depending upon the desulfurization process utilized, the WGS effluent produced may be at a temperature that is higher than recommended for this particular desulfurization process utilized. In such a case, it will be necessary to cool the primary WGS effluent stream (utilizing a heat exchanger not shown) prior to this stream being introduced into the sulfur recovery unit 21. Once the sulfur has been removed from the stream, the resulting stream is then introduced via line 7.2 into the MSU 2. In some instances, it may be desirable to heat the stream from the sulfur recovery unit 21 prior to the stream being introduced into the MSU 2. This heating can be carried out utilizing a heat exchanger (not shown). Once the stream has been treated in the MSU 2, the resulting stream would be purified in a CPU 3 as described hereinbefore, then a secondary WGS reactor 4 as described hereinbefore and then a hydrogen recovery unit 17 as described hereinbefore.

As noted, there are a variety of units that are available to remove sulfur from syngas streams. Such units are readily known in the art. Since the process for removing sulfur tends to result in a product stream which has a lower temperature than desirable for injecting into the primary WGS reactor 1, in those embodiments where sulfur treatment of the syngas stream occurs prior its introduction into the primary WGS reactor 1, it will often be desirable to heat the "sweet" stream prior to further processing. The same holds true for the stream to be introduced into the MSU 2. Such heating may be carried out with a standard heat exchanger to achieve the desired temperature. Note that the steps involving the gasification unit 5 and the primary WGS reactor 1 are as described hereinbefore.

Figure 4:
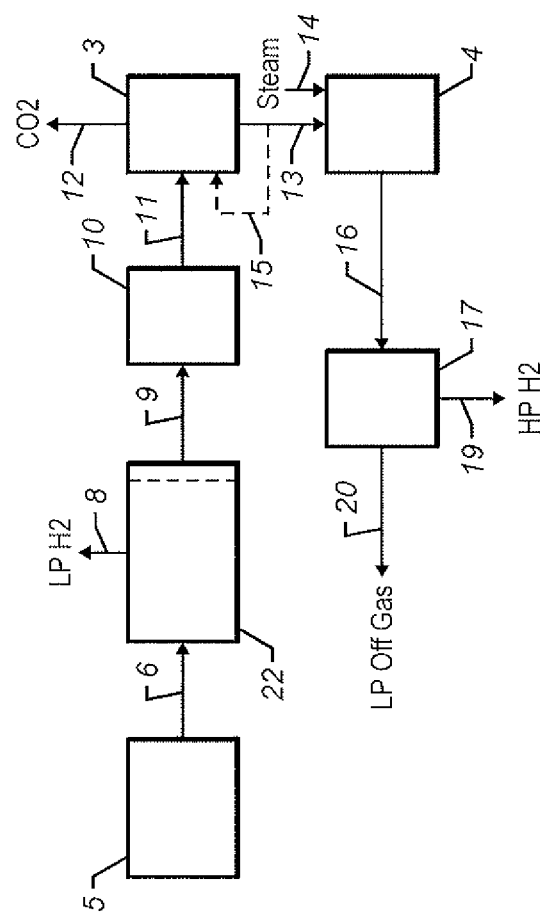
FIG. 4 provides a schematic of the process of the present invention which is carried out utilizing a water gas shift/membrane separation unit reactor, a cryogenic purification unit, a secondary water gas shift reactor and a hydrogen recovery unit.

The second main embodiment of the present invention as depicted in FIG. 4, involves the use of a WGS/MSU reactor 22, a CPU 3, a secondary WGS reactor 4 and a hydrogen recovery unit 17; a sulfur recovery unit 21, a WGS/MSU reactor 22, a MSU 2, a CPU 3, a secondary WGS reactor 4 and a hydrogen recovery unit 17; and a WGS/MSU reactor 22, a sulfur recovery unit 21, a MSU 2, a CPU 3, a secondary WGS reactor 4 and a hydrogen recovery unit 17. One of the main differences between the first and second main embodiments of the present invention resides in the fact that rather than have a separate primary WGS reactor 1 and a separate MSU 2, in this particular embodiment the processing is carried out in a combined WGS/MSU reactor 22. This combined WGS/MSU reactor 22 allows for the increase in $H_2$ and $CO_2$ contents in the high pressure syngas stream and the simultaneous separation of the $H_2$ from the $CO_2$ and remaining components of the high pressure syngas stream. As with the previous MSU 2, the MSU portion in the WGS/MSU reactor 22 includes one or more membranes that are highly selective for hydrogen, each of the membranes having a permeate side and a residue side and allowing for the passing of hydrogen to the permeate side at low pressure to form a first membrane stream on the permeate side of the membrane and the retention of carbon dioxide and the remaining components at high pressure to form a second membrane stream on the residue side of the membrane. As with the first embodiment, the "highly selective for $H_2$ membrane" is capable of allowing for the passage of $H_2$ while limiting the passage of other components thereby resulting in a permeate stream that is $H_2$ rich as defined herein before. The WGS/MSU reactor 22 of the present invention is known in the art and may be of the type represented in US Patent Publication No. 2008/0000350, US Patent Publication No., 2009/0180949, US Patent Publication No. 2010/0104903, U.S. Pat. No. 7,703,519, An Economic Feasibility Study for Water Gas Shift Membrane Reactor, A. Criscuoli et al., Journal of Membrane Science 181 (2001) pages 21-27, and Water Gas Shift Membrane Reactor For $CO_2$ Control In IGCC Systems: Techno-economic Feasibility Study, Energy Conyers. Mgmt. Vol. 38, Suppl., pp. S159-S164 (1997), although the present invention is not meant to be limited by these noted references and variations in reactors are intended to be covered by the present invention.

As in the first main embodiment, the first step of the second main embodiment as depicted in FIG. 4 involves generating a high pressure syngas stream comprising at least $H_2$ and $CO_2$ from one or more hydrocarbon fuel sources in the gasification unit 5 as described hereinbefore. Accordingly, with regard to this particular embodiment, the high pressure syngas stream is introduced via line 6 into the WGS/MSU reactor 22 where the stream is processed to achieve a first membrane stream and a second membrane stream. In many of the gasification units 5 contemplated for use in the present invention, the resulting syngas stream produced will already be at a high pressure (a pressure from about 15 bar to about 100 bar, preferably from about 30 bar to about 80 bar). As noted hereinbefore, in the event that the syngas stream produced in the gasification unit 5 has a pressure that is less than about 15 bar, it is possible to include a compressor (not shown) at this point in the process in order to compress the syngas stream to the desired pressure before injecting the high pressure syngas stream into the WGS/MSU reactor 22. In addition, in the event that the temperature of the high pressure syngas stream is outside of the desired temperature range (from about 200° C. to about 500° C., preferably from about 250° C. to about 450° C., and even more preferably from about 300° C. to about 400° C.), a heat exchanger (not shown) may be utilized to achieve the desired temperature range. In one alternative of the present embodiment, steam is added to the high pressure syngas stream for the water gas shift reaction.

As noted, the type of membrane to be utilized must be highly selective for H2. However, unlike the first embodiment where a wide variety of membranes are available for use in the MSU 2, due to the conditions in the WGS/MSU reactor 22 that the membrane is subjected to, the choice of membrane is much more limited than in the MSU 2. More specifically, with regard to this second main embodiment, the preferred membranes are dense phase metallic membranes with palladium palladium membranes being the most preferred dense phase metallic membrane.

By passing the syngas stream through the WGS/MSU reactor 22, a first membrane stream and a second membrane stream are obtained. This first membrane stream, in the form of a H2 rich stream, is withdrawn from the permeate side of the membrane via line 8 and may be routed to additional processes for use. The second membrane stream that is obtained from the residue side of the membrane is withdrawn via line 9. The withdrawn stream is processed through a compressor (not shown) and a dehydration unit 10 as described hereinbefore.

As noted hereinbefore, the withdrawn stream is processed in the dehydration unit 10 to reduce the dew point in the second membrane stream to a temperature that is lower than the temperature utilized in the CPU 3 purification of the stream (the temperature reached in the next cryogenic purification step) in order to produce a compressed and dried second membrane stream.

Once the second membrane stream has been dried and compressed, it is withdrawn and passed into the CPU 3 via line 11 to be processed in the CPU 3. In the CPU 3, the CO2 is separated and potentially purified through multiple or single step partial condensation and/or distillation using external refrigeration means or an auto-refrigerated process to produce a $CO_2$ rich stream and a high pressure non-condensable mixture of at least CO, $H_2$ and $CO_2$ as described hereinbefore. This $CO_2$ rich stream is withdrawn via line 12.

The high pressure non-condensable mixture that is obtained from the CPU 3 purification of the second membrane stream is then routed to a secondary WGS reactor 4 via line 13 where it is further processed to even further increase the H2 concentration in the high pressure non-condensable mixture as described hereinbefore with regard to the first main embodiment. Any WGS reactor that is known in the art may be utilized as the secondary WGS reactor 4. The WGS reaction in each of the WGS reactors 1, 4 is carried out under standard operating conditions that are known to those skilled in the art. In a further option, the high pressure non-condensable mixture is heated and steam is added via line 14 to the mixture in order to produce the secondary WGS effluent. In a still further alternative, a portion of the high pressure non-condensable mixture is recycled to the CPU 3 via line 15 and the remaining portion of the high pressure non-condensable mixture is routed via line 13 to the secondary WGS reactor 4. With regard to the secondary WGS effluent, a variety of measures can be taken. More specifically, a portion of this secondary WGS effluent may be recycled to WGS/MSU reactor 22, remaining being used for hydrogen recovery.

Figure 5:
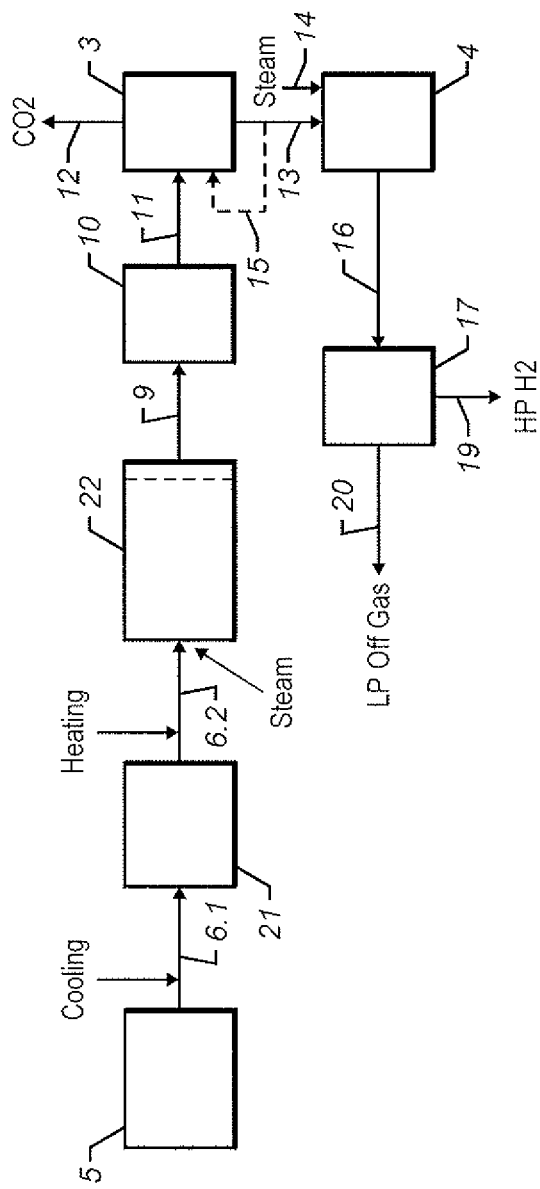
FIG. 5 provides a schematic of the process of the present invention which is carried out utilizing a sulfur recovery unit, a water gas shift/membrane separation unit reactor, a cryogenic purification unit, a secondary water gas shift reactor and a hydrogen recovery unit.

The secondary WGS effluent is then processed in a hydrogen recovery unit 17. Such hydrogen recovery units 17 are known in the art and include hydrogen recovery units 17 as defined herein before. The parameters for operating hydrogen pressure swing adsorption units and additional hydrogen membrane separation units are known in the art. In a still further alternative to the second main embodiment of the present invention as depicted in FIG. 5, as with the first main embodiment, depending upon the high pressure syngas stream produced in the gasification unit 5, it may be advantageous to remove sulfur compounds that are present. With regard to the present embodiment, this may be accomplished by removing the sulfur compounds present prior to the syngas stream being introduced into the WGS/MSU reactor 22. More specifically, this alternative comprises removing the sulfur compounds present in the high pressure syngas stream in a sulfur recovery unit 21 to form a sweet high pressure syngas stream prior to the high pressure syngas stream being introduced into the WGS/MSU reactor 22. With regard to this embodiment, as noted above the syngas stream will typically be at a temperature that could be considered higher than recommended for the particular desulfurization process. Accordingly, in many instances it will be necessary to cool the syngas stream (utilizing a heat exchanger) prior to this stream being introduced into the sulfur recovery unit 21. This cooling will occur along line 6.1. Once a portion or all of the sulfur has been removed from the stream, the resulting stream is then introduced into the WGS/MSU reactor 22 via line 6.2. As it is necessary for the stream being introduced into the WGS/MSU reactor 22 to be at a high temperature (note the range above of about 200° C. to about 500° C.), in many instances it will be necessary to heat such stream and in some instances to also include steam to enable the water gas shift reaction in the WGS/MSU reactor 22. The heating can be carried out utilizing a heat exchanger (not shown).

Once the stream has been treated in the WGS/MSU reactor 22, the resulting stream would be treated in the CPU 3, then the secondary WGS reactor 4 and then and the hydrogen recovery unit 17 as described hereinbefore.

Figure 6:
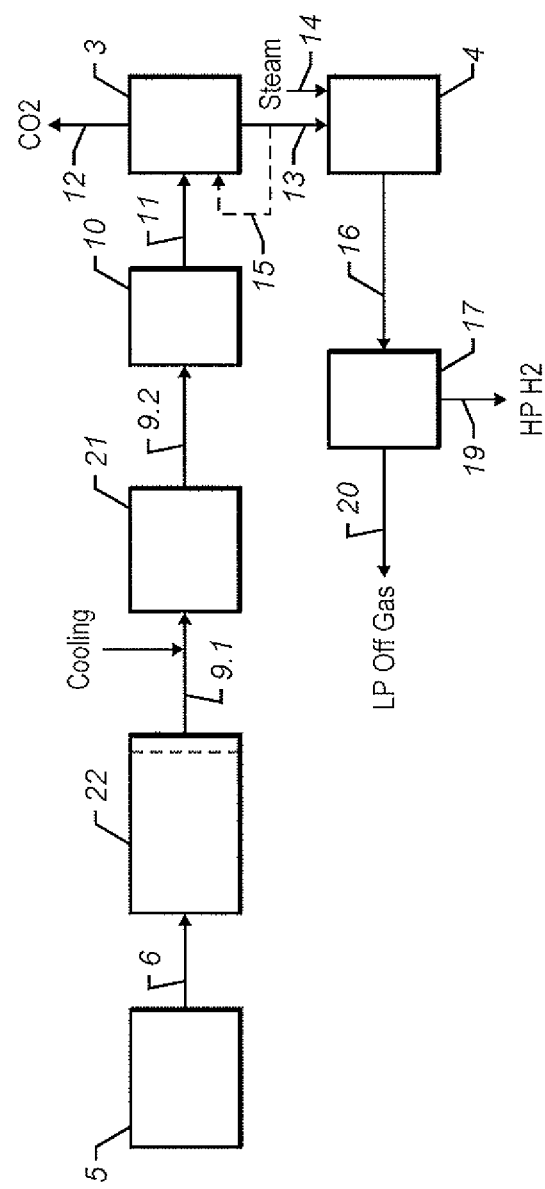
FIG. 6 provides a schematic of the process of the present invention which is carried out utilizing a water gas shift/membrane separation reactor, a sulfur recovery unit, a cryogenic purification unit, a secondary water gas shift reactor and a hydrogen recovery unit.

In an even further alternative of the second main embodiment of the present invention as depicted in FIG. 6, sulfur is removed by varying the placement of the sulfur recovery unit 21 as shown in FIG. 5. In this particular alternative, the sulfur recovery unit 21 is positioned after the WGS/MSU reactor 22. Accordingly, the second membrane stream is passed along via line 9.1 to the sulfur recovery unit 21. As in the previous embodiment, depending upon the sulfur recovery unit 21 utilized, it may be necessary to cool the second membrane stream prior to it being introduced into the sulfur recovery unit 21. Once a portion or all of the sulfur has been removed from the stream, the resulting stream is then introduced via line 9.2 into the dehydration unit 10. Once the stream has been treated in the dehydration unit 10, the resulting stream would be treated in the CPU 3, then the secondary WGS reactor 4 and then and the hydrogen recovery unit 17 as described hereinbefore.

The processes of the present invention have a variety of applications. More specifically, these processes may be utilized in situations where $CO_2$ capture is desired while using coal or refinery residue as fuel, such as power plants, or hydrogen plants.

LISTING OF THE ELEMENTS (1) Primary WGS reactor
(2) MSU
(3) CPU
(4) Secondary WGS reactor
(5) Gasification unit
(6) Line for introducing high pressure syngas stream into the primary WGS reactor
(7) line for introducing primary WGS affluent into the MSU
(8) line for withdrawing H2 reached during
(9) line for passing secondary membrane strain to dehydration unit

(10) dehydration unit
(11) line for passing dried compressed second membrane stream to the CPU
(12) line for withdrawing CO2 rich stream
(13) line for passing high pressure non-condensable mixture obtained from the CPU to the secondary WGS reactor
(14) line which steam is added
(15) line by which a portion of the high pressure non-condensable mixture withdrawn from the CPU is recycled back to the CPU
(16) line for withdrawing secondary WGS effluent
(17) hydrogen recovery unit
(18) not used
(19) line for withdrawing hydrogen
(20) line for withdrawing off gas from the hydrogen recovery unit
(21) sulfur recovery unit
(22) WGS/MSU reactor

What is claimed is:

1. A process for recovering high purity gaseous hydrogen and high purity gaseous carbon dioxide from a syngas stream, the process comprising the steps of:
    a) generating a high pressure syngas stream comprising at least hydrogen and carbon monoxide from one or more solid fuel sources in a gasification unit 5;
    b) treating the high pressure syngas stream in a water gas shift reactor in order to further increase the hydrogen and carbon dioxide contents in the high pressure syngas stream thereby obtaining a water gas shift effluent;
    c) allowing the water gas shift effluent to pass from the water gas shift reactor and be introduced into a membrane separation unit that includes one or more modules, each module having one or more membranes that are highly selective for hydrogen, each of the membranes having a permeate side and a residue side and allowing for the passing of hydrogen to the permeate side to form a first membrane stream on the permeate side of the membrane and the retention of carbon dioxide and the remaining components in the water shift effluent to form a second membrane stream on the residue side of the membrane;
    d) withdrawing the first membrane stream for further use;
    e) processing the second membrane stream through a compressor to achieve a pressure that is suitable for carbon dioxide removal in a cryogenic purification unit and a dehydration unit to reduce the dew point to a temperature that is lower than the temperature reached in the next step in order to produce a compressed and dried second membrane stream;
    f) processing the compressed and dried second membrane stream through a cryogenic purification unit wherein carbon dioxide is separated and purified through multiple or single step partial condensation and/or distillation using external refrigeration means or an auto-refrigerated process to produce a carbon dioxide rich stream and a high pressure non-condensable mixture of at least carbon monoxide, hydrogen and carbon dioxide;
    (g) the high pressure non-condensable mixture is routed to a second water gas shift reactor where it is further processed to further increase the hydrogen concentration in the high pressure non-condensable mixture thereby forming a secondary water gas shift effluent; and
    (h) the secondary water gas shift effluent is routed to a hydrogen recovery unit for the recovery of hydrogen.

2. The process of claim 1, wherein the second membrane stream is compressed prior to be processed in the dehydration unit.

3. The process of claim 1, wherein the second membrane stream is processed in the dehydration unit prior to being compressed.

4. The process of claim 1, wherein the carbon dioxide rich stream is withdrawn for further use.

5. The process of claim 1, wherein steam is added to the high pressure syngas for the water gas shift reaction.

6. The process of claim 5, wherein the process further comprises removing the sulfur compounds present in the water gas shift effluent in a sulfur recovery unit to form a sweet effluent stream prior to the effluent stream being introduced into the membrane unit.

7. The process of claim 6, wherein the sweet effluent stream is heated prior to being sent to the membrane separator.

8. The process of claim 5, wherein the process further comprises removing the sulfur compounds present in the high pressure syngas stream to form a sweet high pressure syngas stream prior to the high pressure syngas stream being introduced into the water gas shift unit.

9. The process of claim 8, wherein the sweet high pressure syngas stream is heated and steam is added for the water gas shift reaction.

10. The process of claim 1, wherein the water gas shift effluent is cooled to a temperature that is suitable for the membranes downstream.

11. The process of claim 1, wherein a portion of the high pressure non-condensable mixture is recycled to the cryogenic purification unit and the remaining portion of the high pressure non-condensable mixture is routed to a second water gas shift reactor where it is further processed to further increase the hydrogen concentration in the high pressure non-condensable mixture.

12. The process of claim 11, wherein for the second water gas shift reaction the high pressure non-condensable mixture is heated and steam is added to produce a second water gas shift effluent.

13. The process of claim 1, wherein the hydrogen recovery unit is selected from a hydrogen pressure swing adsorption unit, an additional hydrogen membrane unit or a combination of a hydrogen pressure swing adsorption unit and an additional hydrogen membrane unit.

14. The process of claim 1, wherein the pressure of the high pressure syngas stream is from 15 bar to a 100 bar.

15. The process of claim 1, wherein the high pressure syngas stream is heated to a temperature from 200° C. to 450° C.

16. The process of claim 1, wherein the solid fuel source is selected from coal, petcoke, and biofuel.

17. The process of claim 1, wherein the second membrane stream is compressed to a pressure from 30 bar to 80 bar.

18. The process of claim 1, wherein the dew point of the compressed second membrane stream is reduced to a temperature that is suitable for cryogenic purification without causing the plugging of the processing unit due to water freezing.

19. The process of claim 14, wherein the pressure of the high pressure syngas stream is from 30 bar to 80 bar.

20. A process for recovering high purity gaseous hydrogen and high purity gaseous carbon dioxide from a syngas stream, the process comprising the steps of:
    a) generating a high pressure syngas stream comprising at least hydrogen and carbon monoxide from one or more solid fuel sources in a gasification unit;
    b) processing the high pressure syngas stream in a hydrogen membrane/water gas shift reactor which allows for the increase in hydrogen and carbon dioxide contents in the high pressure syngas stream and the simultaneous separation of the hydrogen from the carbon dioxide and remaining components of the high pressure syngas stream, the separation of the hydrogen from the carbon dioxide and remaining components being achieved by utilizing membrane separation unit that includes one or more modules, each module having one or more membranes that are highly selective for hydrogen, each of the membranes having a permeate side and a residue side and allowing for the passing of hydrogen to the permeate side at low pressure to form a first membrane stream on the permeate side of the membrane and the retention of carbon dioxide and the remaining components at high pressure to form a second membrane stream on the residue side of the membrane;

c) withdrawing the first membrane stream for further use;

d) processing the second membrane stream through a compressor to achieve a pressure that is suitable for carbon dioxide removal in a cryogenic purification unit and a dehydration unit to reduce the dew point to a temperature that is lower than the temperature reached in the next step in order to produce a compressed and dried second membrane stream;

e) processing the compressed and dried second membrane stream through a cryogenic purification unit wherein carbon dioxide is separated and purified through multiple or single step partial condensation and/or distillation using external refrigeration means or an auto-refrigerated process to produce a carbon dioxide rich stream and a high pressure non-condensable mixture of at least carbon monoxide, hydrogen and carbon dioxide;

f) the high pressure non-condensable mixture is routed to a second water gas shift reactor where it is further processed to further increase the hydrogen concentration in the high pressure non-condensable mixture thereby forming a secondary water gas shift effluent; and g) the secondary water gas shift effluent is routed to a hydrogen recovery unit for the recovery of hydrogen.

21. The process of claim 20, wherein the second membrane stream is compressed prior to be processed in the dehydration unit.

22. The process of claim 20, wherein the second membrane stream is processed in the dehydration unit prior to being compressed.

23. The process of claim 20, wherein steam is added to the high pressure syngas for the water gas shift reaction in the hydrogen membrane/water gas shift reactor.

24. The process of claim 20, wherein the process further comprises removing the sulfur compounds present in the high pressure syngas stream in a sulfur recovery unit to form a sweet high pressure syngas stream prior to the high pressure syngas stream being introduced into the hydrogen membrane/water gas shift reactor.

25. The process of claim 24, wherein the sweet high pressure syngas stream is heated and steam is added for the water gas shift reaction in the hydrogen membrane/water gas shift reactor.

26. The process of claim 20, wherein the process further comprises removing the sulfur compounds present in the second membrane stream in a sulfur recovery unit to form a sweet second membrane stream prior to the second membrane stream being introduced into the dehydration unit.

27. The process of claim 20, wherein a portion of the high pressure non-condensable mixture is recycled to the cryogenic purification unit and the remaining portion of the high pressure non-condensable mixture is routed to the second water gas shift reactor where it is further processed to further increase the hydrogen concentration in the high pressure non-condensable mixture.

28. The process of claim 27, wherein the high pressure non-condensable mixture is heated and steam is added during the second water gas shift reaction to produce a second water gas shift effluent.

29. The process of claim 28, wherein the hydrogen recovery unit is selected from a hydrogen pressure swing adsorption unit, an additional hydrogen membrane unit or a combination of a hydrogen pressure swing adsorption unit and an additional hydrogen membrane unit.

30. The process of claim 20, wherein the pressure of the high pressure syngas stream is from 15 bar to 100 bar.

31. The process of claim 20, wherein the high pressure syngas stream is heated to a temperature from 200° C. to 450° C.

32. The process of claim 20, wherein the solid fuel source is selected from coal, petcoke and biofuel.

33. The process of claim 20, wherein the second membrane stream is compressed to a pressure from 30 bar to 80 bar.

34. The process of claim 20, wherein the dew point of the compressed second membrane stream is reduced to a temperature that is suitable for cryogenic purification without causing plugging of the processing unit due to water freezing.

35. The process of claim 31, wherein the pressure of the high pressure syngas stream is from 30 bar to 80 bar.

* * * * *